INVENTOR
ROBERT L. JAMES
BY Herbert L. Harris
ATTORNEY

INVENTOR.
ROBERT L. JAMES
BY Herbert L. Davis
ATTORNEY

United States Patent Office
3,449,597
Patented June 10, 1969

3,449,597
SIGNAL SAMPLER NETWORK
Robert L. James, Bloomfield, N.J., assignor to The Bendix Corporation, a corporation of Delaware
Filed Sept. 23, 1965, Ser. No. 489,640
Int. Cl. H03k 17/02
U.S. Cl. 307—257 4 Claims

ABSTRACT OF THE DISCLOSURE

A dual signal sampler network including dual bridge means, each of said bridge means being controlled by a voltage responsive Zener diode, the Zener diode permitting passage of a sampled signal through the controlled bridge means upon a reverse current breakdown of the Zener diode by a selected passage of a reverse current breakdown control pulse, and inductive coupling means for simultaneously applying a reverse current breakdown control pulse to the Zener diode controlling each bridge means so as to simultaneously render both the dual bridge means conductive of respective dual sampled signals.

*Cross reference to related applications and patent*

The present invention is directed to the novel signal sampler network 18 described and claimed herein with reference to FIGURE 2. The pulse width modulated servo drive control system described herein with reference to FIGURE 1 is the subject matter of a U.S. application Ser. No. 484,547, filed Sept. 2, 1965, by Robert L. James and Harold Moreines. The method of controlling a direct current motor described herein is the subject matter of a U.S. application Ser. No. 484,528, filed Sept. 2, 1965, by Harold Moreines; the preamplifier and adder network 16 and 34 of FIGURE 2 is the subject matter of a U.S. application Ser. No. 489,627, filed Sept. 23, 1965, by Robert L. James; the pulse width modulator network 20 of FIGURE 2 is the subject matter of a U.S. application Ser. No. 491,326, filed Sept. 29, 1965, by Robert L. James; the two channel trigistor output stage motor control system 20–22 of FIGURE 1 is the subject matter of a U.S. application Ser. No. 491,585, filed Sept. 30, 1965, by Robert L. James, now U.S. Patent No. 3,398,345, granted Aug. 20, 1968; the novel timing network 15 of FIGURE 1 is the subject matter of a U.S. application Ser. No. 698,564, filed Jan. 17, 1968, as a division of a U.S. application Ser. No. 496,428, filed Oct. 15, 1965, by Robert L. James, now U.S. Patent No. 3,401,324, granted Sept. 10 1968, for a Timing Network for a Modulated Servo Drive Control System; and the novel rate feedback loop network 14 of FIGURE 1 is the subject matter of a U.S. application Ser. No. 496,577, filed Oct. 15, 1965, by Robert L. James, now U.S. Patent No. 3,378,745, granted Apr. 16, 1968. All of foregoing applications and patents have been assigned to The Bendix Corporation, the assignee of the invention described and claimed herein.

*Summary of the invention*

This invention relates to a signal sampler network and more particularly to a novel multi channel signal sampler network which may be selectively controlled to sample direct current control signals to operate a pulse width modulator to drive a direct current motor (having a fixed direct current field) linearly in response to such direct current control signals.

An object of the invention is to provide in such a servo motor control system a multiple bridge means, each of said bridge means including a Zener diode to render the bridge means conductive of a sampled signal upon a second controlling pulse being applied to the Zener diode to effect a reverse current breakdown thereof so as to permit passage of the sampled signal through the Zener diode and corresponding bridge means.

Another object of the invention is to provide in such a servo motor control system novel dual bridge means, each of said bridge means including a Zener diode to render the bridge means conductive of a sampled signal upon a reverse current breakdown of the Zener diode being effected and inductive means for simultaneously applying a reverse current breakdown pulse to each of the Zener diodes to render both the bridge means conductive of the sampled signal.

Another object of the invention is to provide in such a servo motor control system novel signal sampling means for pulsing the torque of a controlled servo motor so as to effectively overcome static friction levels that may exist even for small errors, and effect high efficiency from a transistor drive controlling the servo motor.

These and other objects and features of the invention in the novel signal sampler network have been pointed out in the following description as applied to a pulse width modulates servo drive control system shown in the accompanying drawings and in which the novel signal sampling network of the present invention is particularly adapted for use. It is to be understood, however, that the drawings are for the purpose of illustration only and are not a definition of the limits of the invention. Reference is to be had to the appended claims for this purpose.

Figure 1:
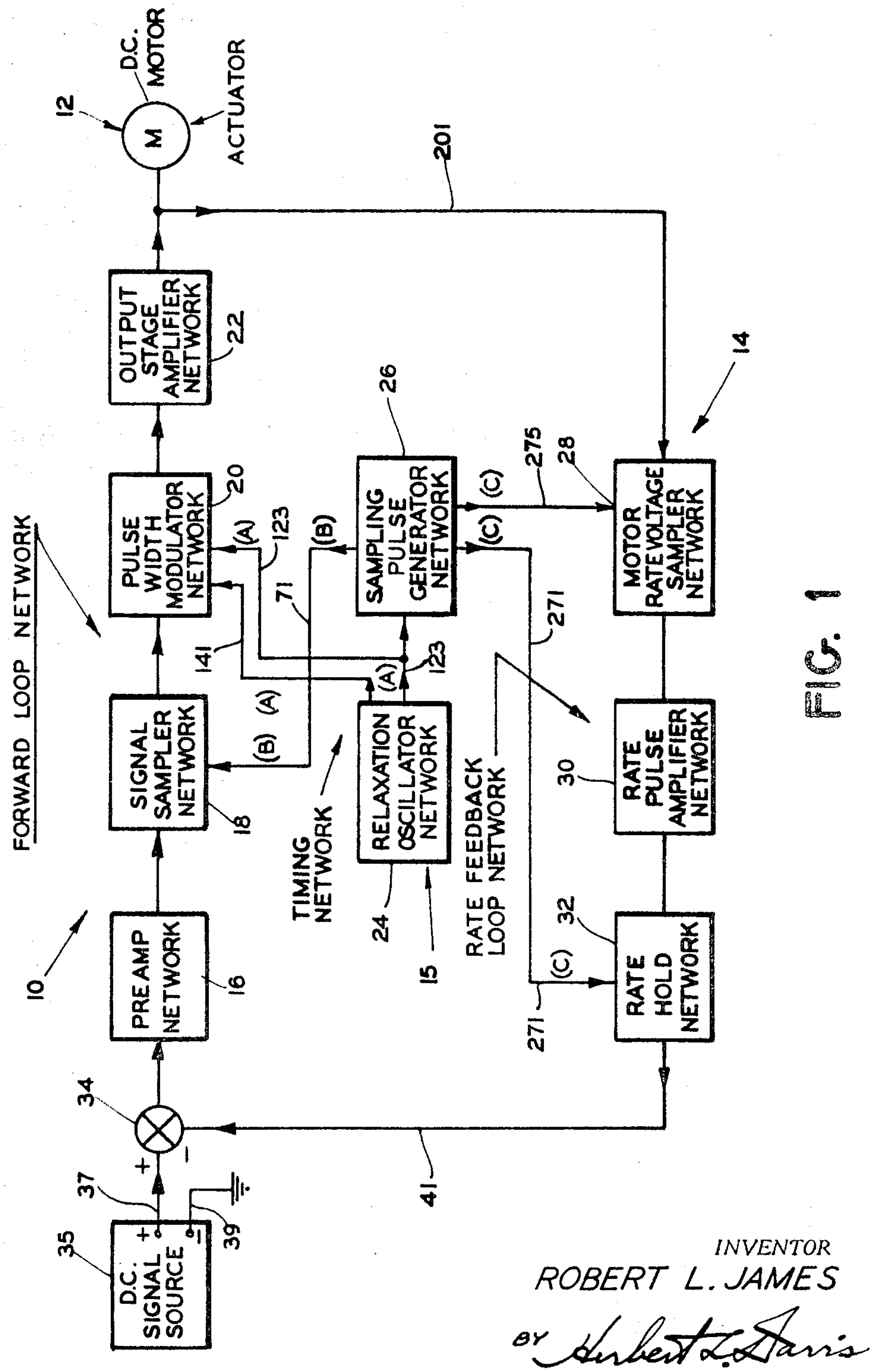
FIGURE 1 is a schematic block diagram illustrating a pulse width modulated servo drive control system in which the signal sampler network embodying the invention is particularly adapted for use.

Referring to the drawing of FIGURE 1, the system includes a forward loop network of a pulse width modulator type indicated generally by the numeral 10, a direct current motor actuator 12 and a rate feedback loop network 14, together with a timing network 15 for controlling the forward loop network 10 and the rate feedback loop network 14.

Included in the forward loop network 10 is a preamplifier network 16 of a novel arrangement to effect impedance matching, signal inverting and supplying quiescent bias requirements to a signal sampler network 18. The signal sampler network 18 samples the signal output from the preamplifier 16 superimposed on the quiescent bias output of the preamplifier network 16. The pulse width modulator 20 converts the amplitude modulated output of the signal sampler 18 to a constant amplitude recurring pulse having a pulse width proportional to the amplitude of the input signal.

An output stage amplifier network 22 delivers these pulses applied by the pulse width modulator network 20 to the direct current motor actuator 12. As hereinafter explained, the timing network 15 may include a relaxation oscillator network 24 and sampling pulse generator network 26 to supply required timing and sampling pulses to the motor rate voltage sampler network and rate hold network of the rate feedback loop network 14 and to the pulse width modulator network 20 and signal sampler network 18 of the forward loop network 10.

In the rate feedback loop network 14 there is provided the motor rate voltage sampler network 28 which samples the back electromotive forces at the direct current actuator motor 12 applied across lines 201 and 203 at regular recurring times between power driving pulses applied to the actuator motor 12 across lines 79 and 104. A resistance loading 105 connected across the single load winding 42 of the actuator motor 12 determines the peak (initial) value of the motor turn off inductive kick voltage.

A variable amplitude fixed duration output of the motor voltage sampler 28 is amplified by a rate pulse amplifier 30 and supplied to a rate hold circuit 32 which serves to hold the amplitude of the short duration pulse received from the rate hold amplifier 30 and delivers an equal amplitude direct current voltage at the adder network 34 to the input of the preamplifier 16 of the forward loop network 10 of the servo control system between said regular recurring times and thereby complete the rate feedback loop network 14.

Figure 2:
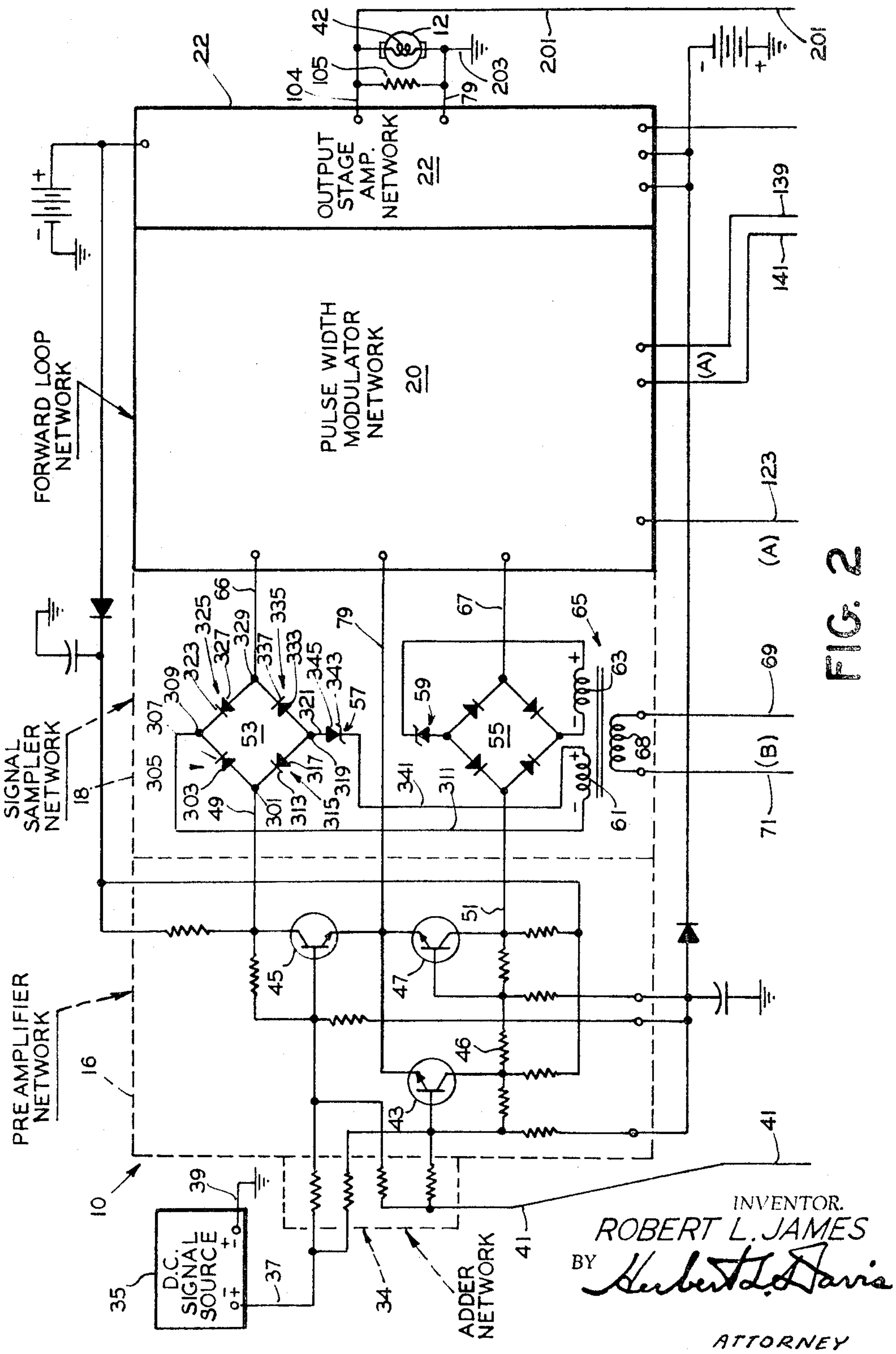
FIGURE 2 is a wiring diagram of the forward loop network of the servo drive control system of FIGURE 1 showing a signal sampler network which embodies the present invention as applied in the operative arrangement shown.

The electrical network of the several components of the system of FIGURE 1 are shown in detail and explained in the aforenoted U.S. Patent No. 3,401,324. A direct current signal source of conventional type and indicated by the numeral 35 supplies a direct current command voltage signal of variable amplitude and selected polarity across the conductors 37 and 39. The resistance adder network 34, as shown by FIGURE 2, combines this voltage signal with the follow up or rate feedback signal voltage of an amplitude variable directly with the velocity of the motor 12 and supplied through a conductor 41 from the output of the rate feedback loop network 14 so as to provide a direct current error voltage signal (obtained from subtraction of the command and rate feedback signals) applied through the preamplifier 16 to the signal sampler circuit 18 and thereby to the pulse width modulator 20 and output stage amplifier 22 to provide signal pulses across a control or load winding 42 of the actuator motor 12 which signal pulses have a width variable directly with the amplitude of the voltage of the direct current error signal. The preamplifier 16 is a two channel direct current amplifier including transistors 43, 45, and 47 of low voltage gain (large local feedback) so as to provide impedance matching to the signal sampler circuit 18 and a phase inversion to selectively provide two output signals at lines 49 and 51 opposite phase dependent upon the polarity of the input command voltage signal at conductor 37 and thereby effect the high direct current bias levels needed for the unijunction transistor pulse circuits of the pulse width modulator 20.

In the operation of the preamplifier 16 it will be seen that upon a positive signal being applied to the input conductor 37 and thereby to the base of the transistor 45, the transistor 45 will be rendered more conductive and thus the collector output at the line 49 becomes less positive. Conversely the positive signal supplied through the input conductor 37 will be applied to the base of the transistor 43 which will cause the transistor 43 to become more conductive causing the collector output coupled through a resistor 46 to the base of the transistor 47 to become less positive and the transistor 47 less conductive so that the output line 51 from the collector of the transistor 47 becomes more positive. Thus upon a positive signal being applied at the input conductor 37, the output line 49 of the transistor 45 becomes less positive while the output line 51 from the transistor 47 becomes more positive.

If the operating conditions are reversed and a negative direct current signal is applied through the conductor 37, it will be seen that the negative bias then applied to the base of the transistor 45 will cause the transistor 45 to become less conductive and the output line 49 therefrom more positive and conversely the negative signal applied to the base of the transistor 43 will render the transistor 43 less conductive and thereby the transistor 47 coupled thereto more conductive so that the output line 51 leading from the collector of the transistor 47 will become less positive.

Of course, upon a zero signal being applied to the input conductor 37, the positive bias applied by the battery 74 to the collector of the transistor 45 and to the collector of the transistor 47 will provide output signals at the lines 49 and 51 of equal positive value. The output lines 49 and 51 lead from the preamplifier network 16 into the signal sampler network 18.

The signal sampler network 18 includes balanced diode bridges 53 and 55, Zener diodes 57 and 59 and secondary windings 61 and 63 of a pulse sampling transformer 65 having a primary winding 68 with conductors 69 and 71 leading to the forward loop network 10 of FIGURE 2 from the sampling pulse generator 26 of FIGURE 1 so as to control the operation of the signal sampler network 18, as heretofore explained in the aforenoted U.S. Patent No. 3,401,324.

The lines 49 and 51 apply output signals of opposite phase from the preamplifier 16 dependent upon the polarity of the command signal voltage applied at input conductor 37. The balanced diode bridges 53 and 55 are so controlled as to rapidly connect and disconnect the outputs of the preamplified transistors 45 and 47 to pulse generator charging capacitors of the pulse width modulator 20, as explained in the aforenoted U.S. Patent No. 3,401,324.

The output pulses applied across the conductors 104 and 203 to the load winding 42 of the motor 12 will be in a polarity sense dependent upon whether the direct current command signal applied at the input 37 is of a positive or negative polarity and these output pulses will be at a repetition rate dependent upon the predetermined time interval of the reference pulses A supplied by the relation oscillator 15 through the conductors 123, 139 and 141 to the pulse width modulator network 20, as explained in the U.S. Patent No. 3,401,324. Moreover, the duration of these motor control pulses will be dependent upon the amplitude of the direct current command signal applied through the input conductor 37.

Thus the reference pulse A sets the repetition rate of the motor drive pulses applied through the pulse width modulator 20 and serves as a timing reference for all circuit functions.

The pulse generators of the pulse width modulator 20 are reset for the start of each new cycle by the pulse A applied through the conductor 123. This resetting operation is completed just prior to sampling the direct current signal for initially charging the capacitors of the pulse width modulator 20.

Besides the reference pulse A, shown graphically in FIGURE 1, there are generated two sampling pulses of controlled duration from the occurrence of the pulse A. Similar circuitry is used for both of the sampling pulses. One of the pulses is a sampling pulse B for energizing the signal sampler network 18 of FIGURE 2 and the other sampling pulse is denoted as pulse C applied through the conductor 275 to the motor rate voltage sampler network 28 and through the conductor 271 to the rate hold network 32 of FIGURE 1, as explained in greater detail in the U.S. Patent No. 3,401,324.

*Signal sampler network*

The present invention is directed to a novel signal sampler network 18 which may be used in the heretofore described control system of FIGURES 1 and 2.

In the aforenoted control system, the preamplified network 16 includes output conductors 49 and 51 through which may be applied positive output voltage signals of equal value or of a greater positive value at one conductor (49 or 51) and of a lesser positive value at the other conductor (49 or 51) dependent upon the polarity of the command signal applied at the conductor 37.

The output signal voltage conductor 49 is periodically connected through the bridge network 53 to the signal voltage sampler conductor 66 through the operation of the Zener diode 57 while the output signal voltage conductor 51 is simultaneously connected through the bridge network 55 to the signal voltage sampler conductor 67 through the operation of the Zener diode 59. Both the Zener diode 57 and the Zener diode 59 are rendered conductive in the reverse direction to effect this operation by signal sampler control voltages induced in the secondary windings 61 and 63 of the transformer 65.

The Zener diodes 57 and 59 are of a type having a unique reverse breakdown characteristic which permits conduction in the back direction when voltages such as the signal sampler control voltages induced in the secondary windings 61 and 63 (exceeding the reverse current breakdown value) are applied. Moreover, each of the Zener diodes 57 and 59 in the reverse current or back direction has a substantially constant threshold potential greater than that of the signal voltage applied at conductors 49 and 51 and below which the Zener diode 57 and 59 are nonconductive and above which they are conductive and having a substantially constant impedance when conductive in the reverse current direction.

In explanation of the foregoing, the voltage signal at the output conductor 49 is applied to an arm 301 of the balanced bridge 53. The arm 301 is connected to an anode element 303 of a diode 305 having a cathode element 307 connected to an arm 309 of the bridge 53 from which leads a conductor 311.

The arm 301 of the bridge 53 is also connected to a cathode element 313 of a diode 315 having an anode element 317 connected to an arm 319 of the bridge 53 from which leads a conductor 321.

The arm 309 of the bridge 53 is further connected to a cathode element 323 of a diode 325 having an anode element 327 connected to an arm 329 of the bridge 53 from which leads a conductor 66.

Also the arm 319 of the bridge 53 is further connected to an anode element 333 of a diode 335 having a cathode element 337 connected to the arm 329 of the bridge 53 from which leads the conductor 66.

The conductor 311 leads to one end of the secondary winding 61 of the pulse sampling transformer 65 while the opposite end of the secondary winding 61 is connected by a conductor 341 to a cathode element 343 of the Zener diode 57 having an anode element 345 connected to the conductor 321 leading to the arm 319 of the bridge 53.

The Zener diode 57 is a voltage responsive control means having a voltage responsive reverse current breakdown characteristic of a sufficiently high value as to normally prevent the passage therethrough of the positive voltage signal applied at the conductor 49 and through arm 301, diode 305, conductor 311, secondary winding 61, conductor 341 to the cathode element 343 of the Zener diode 57. Thus in the absence of a signal sampling pulse B being induced in the secondary winding 61, the Zener diode 57 and thereby the bridge 53 is nonconductive of current flow from the conductor 49 to the conductor 66.

However, upon the signal sampling pulse B being applied to the primary winding 68 of the transformer 65 by the sampling pulse generator 26 of FIGURE 1, as heretofore explained in the aforenoted U.S. Patent No. 3,401,324, there will be induced in the secondary winding 61 a sampling control pulse acting in a negative going sense with relation to the conductor 311 and in a positive going sense with relation to the conductor 341 and of a sufficiently high voltage as to exceed the reverse current breakdown characteristic of the Zener diode 57, whereupon the Zener diode 57 is rendered effective in response to the high voltage of the sampling control pulse to permit a reverse flow of current therethrough.

The positive signal voltage applied at the conductor 49 then effects a flow of current through diode 305, conductor 311, secondary winding 61, conductor 341, Zener diode 57 (upon the reverse current breakdown thereof), conductor 321, diode 335, bridge arm 329 and through the output conductor 66 to the pulse width modulator network 20.

On the other hand, the sampling control pulse induced in the secondary winding 61 will be cancelled out at the opposite input and output conductors 49 and 66 by the positive going sampling control pulse being applied through the conductor 341 and Zener diode 57 to the bridge arm 319 and from the bridge arm 319 through the diodes 315 and 335 and the diodes 305 and 325 to the bridge arm 309 and thereby returning through the negative going conductor 311 to the secondary winding 61 or source of the induced sampling control pulse. Thus the sampling control pulse induced in the secondary winding 61 has no effect upon the magnitude of the positive signal pulse sampled at the conductor 66.

Upon the signal sampling pulse B, applied at the primary winding 68 being terminated, there will be effected a cessation of the sampling control pulse induced in the secondary winding 61 whereupon the voltage responsive control means or Zener diode 57 will return to a reverse current nonconductive state whereupon the bridge 53 will become ineffective to conduct a sample of the signal voltage applied at conductor 49 to the conductor 66.

In addition to the balanced bridge 53, the signal sampler network 18 includes a second balanced bridge 55 to selectively effect at the output conductor 67 a sample of the voltage signal at the conductor 51. The balanced bridge 55 has a construction and mode of operation that is identical to that of the bridge 53 and therefore a detail explanation of the bridge 55 is not deemed necessary in view of the preceding explanation of the bridge 53 which may be applied to the bridge 55.

However, it may be noted that simultaneous with the application of the signal sampling pulse B to the primary winding 68 of the pulse sampling transformer 65, there will be induced in both the secondary winding 61 and the secondary winding 63, a sampling control pulse which will be applied in a positive going sense to the cathodes of the Zener diodes 57 and 59, respectively, and of sufficiently high voltage as to exceed the reverse current breakdown characteristic of the Zener diodes 57 and 59, whereupon both the Zener diodes 57 and 59 are rendered effective in response to the high voltage of the sampling control pulse to permit a reverse flow of current there through so that the signal voltages applied at the conductors 49 and 51, respectively, may be effectively sampled at the respective output conductors 66 and 67.

Similarly, upon the signal sampling pulse B applied at the primary winding 68 being terminated there will be effected a cessation of the sampling control pulses induced in both the secondary winding 61 and 63 whereupon the voltage responsive control means or Zener diodes 57 and 59 will return to a reverse current nonconductive state so as to simultaneously render the bridge 53 ineffective to conduct a sample of the signal voltage applied at conductor 49 to the conductor 66 and the bridge 55 ineffective to conduct a sample of the signal voltage applied at conductor 51 to the conductor 67.

The sampled signal voltages applied at the conductors 66 and 67 will then be applied to the pulse width modulator network 20 to control the operation of the direct current motor 12, as heretofore explained.

Although only one embodiment of the invention has been illustrated and described, various changes in the form and relative arrangement of the parts, which will now appear to those skilled in the art, may be made without departing from the scope of the invention. Reference is, therefore, to be made to the appended claims for a definition of the limits of the invention.

What is claimed is:

1. A signal sampler network comprising a pair of electrical input means for receiving a pair of voltage signals, a pair of electrical output means from said network, a first bridge network connected between one of said pair of input means and one of said pair of output means, a second bridge network connected between another of said pair of input means and another of said pair of output means, said first and second bridge networks each including a voltage responsive means for controlling the conductivity of the first and second bridge networks of the pair of voltage signals between said pair of input and output means, and selectively operable inductive coupling means for simultaneously applying control voltages to said voltage responsive means for rendering said first and second bridge networks conductive of voltage signals received at said pair of input means to said pair of output means.

2. The combination defined by claim 1 in which the voltage responsive means includes a Zener diode having a reverse current breakdown characteristic below that of the control voltages applied by said inductive coupling means for rendering the first and second bridge networks conductive of said voltage signals.

3. A signal sampler network comprising input means for receiving a pair of voltage signals, output means, means for applying a sample of the pair of voltage signals received at said input means to said output means, said signal sample applying means including first and second diode bridges, the first diode bridge including a first Zener diode connected across opposing arms of the first diode bridge and controllable in one sense for applying through said first diode bridge and to the output means a sample of one of the pair of voltage signals received at said input means, said first Zener diode controllable in another sense to terminate the applying of the sample of said one pair of voltage signals to the output means; the second diode bridge including a second Zener diode connected across opposing arms of the second diode bridge and controllable in one sense for applying through said second diode bridge and to the output means a sample of another of said pair of voltage signals received at said input means, and said second Zener diode controllable in another sense to terminate the applying of the sample of the other of said pair of voltage signals to the output means.

4. The combination defined by claim 3 including selectively operable means for simultaneously controlling said first and second Zener diodes in said one and other senses.

References Cited

UNITED STATES PATENTS

| | | | |
|---|---|---|---|
| 2,562,912 | 8/1951 | Hawley | 307—321 |
| 2,965,771 | 12/1960 | Finkel | 307—257 |
| 3,071,655 | 1/1963 | Lanham | 307—257 |
| 3,201,641 | 8/1965 | Thorne | 307—257 |
| 3,287,617 | 11/1966 | Robinson | 307—257 |

ARTHUR GAUSS, *Primary Examiner.*

R. H. PLOTKIN, *Assistant Examiner.*

U.S. Cl. X.R.

307—321